United States Patent Office 3,036,080
Patented May 22, 1962

3,036,080
QUATERNARY SALTS OF BIS-N,N-(4-BENZYHY-DRYLIDENE-1-ALKYL-PIPERIDINE)-ALKANES
Richard H. Barry, Bloomfield, N.J., assignor to Schering Corporation, Bloomfield, N.J., a corporation of New Jersey
No Drawing. Filed July 5, 1960, Ser. No. 40,534
10 Claims. (Cl. 260—293)

This invention relates to a new group of compounds having desirable pharmacological and physiological properties. More particularly, this invention relates to a novel series of bisquaternary derivatives of 4-benzhydrylidene-1-lower alkyl piperidine which display antibacterial activity and pharmacological properties.

The bis-quaternary compounds of this invention may be represented by the following general formula:

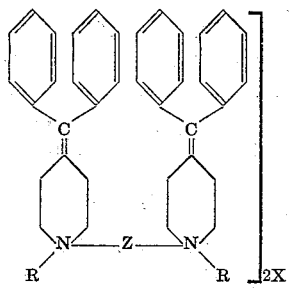

wherein R is a lower alkyl radical, Z is a straight or branched chain saturated hydrocarbon bridge having from 2 to 18 carbon atoms and X is the anion of a non-toxic acid such as chloride, iodide, bromide, phosphate, sulfate, nitrate, acetate or methosulfate.

Typical of the lower alkyl groups represented by R are alkyl groups containing from 1–4 carbon atoms; the methyl group being preferred. Any straight or branched chain saturated hydrocarbon containing from 2–18 carbon atoms may be employed as the hydrocarbon bridge (Z). Particularly preferred are the straight chain hydrocarbons containing from 10–14 carbon atoms.

The novel bis-quaternary compounds of this invention are prepared by reacting two molecular proportions of the tertiary base, 4-benzhydrylidene-1-lower alkyl piperidine as described in United States Patent No. 2,739,968 which was issued on March 27, 1956, with one molecular proportion of an alpha-omega-dihaloalkane as illustrated by the following equation wherein R and Z are as defined above:

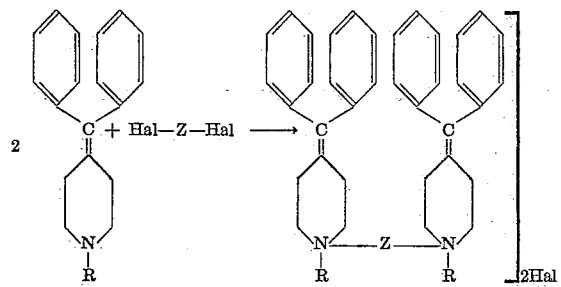

The reaction is carried out usually in the absence of a solvent and preferably at elevated temperatures (i.e. 75°–250° C.). The product is isolated by cooling the reaction mixture and recrystallizing the solid product from suitable solvents such as methanol, ethanol, acetone, etc. or from mixtures of these and/or other conventional solvents. The resulting crude bis-quaternary halide may then be purified by further recrystallization from solvents such as mentioned above.

The bis-quaternary halide, as prepared above, may be converted into other bis-quaternary salts such as the phosphate, sulfate, nitrate, acetate or methosulfate by conventional methods such as by double decompositions with an appropriate metal salt (e.g. silver nitrate, silver acetate, etc.) or by conversion of the bisquaternary halide to the corresponding hydroxide by treatment with moist silver oxide followed by reaction with an acid having the desired radical (e.g. methylsulfuric acid).

The compounds of this invention have a wide spectrum of activity against both bacteria and fungi, particularly the gram positive cocci and the pathogenic dermatophytes. In addition, the compounds in this series show anti-cholinergic and anti-inflammatory activity. Compounds of this series are useful in pharmaceutical products, such as creams, ointments, and lotions for dermatological use; aqueous solutions and tinctures for disinfecting and general antisepsis, for mouth washes, toothpastes, nasal drops and prophylactics; as preservatives for eye drops and parenterally administered solutions and suspensions. Moreover, topical preparations containing the compounds of this invention are useful as body deodorants and antiperspirants. The compounds may be combined advantageously for topical use with other adjunctive antifungal, keratolytic, anesthetic or anti-inflammatory compounds thus making useful therapeutic admixtures thereby. Examples of utilitarian dosage forms are given below, it being understood that 1,10-bis-N,N-(4-benzhydrylidene-1-methylpiperidine)-decane dibromide is employed in the following compositions for purposes of illustration merely and that any of the compounds of this invention could be substituted therefor as a matter of choice.

Mouthwash: Parts by weight
  1,10-bis-N,N-(4-benzhydrylidene-1-methylpiperidine)decane dibromide _____ 0.1 to 0.5
  Disodium phosphate _____ 0.25
  Ethanol _____ 25.0
  Sorbitol solution _____ 20.0
  Cinnamon oil _____ .05
  Peppermint oil _____ 0.1
  Distilled water to 100.0.

Water-soluble antibacterial cream:
  1,10-bis-N,N-(4-benzhydrylidene-1-methylpiperidine)decane dibromide _____ 0.1 to 1.0
  Polyethylene glycol 400, 70%; polyethylene glycol 4000, 30% _____ To 100

Antibacterial cream:
  1,10 - bis - N,N-(4-benzhydrylidene-1-methylpiperidine)decane dibromide _____ 0.25
  Emulsifying wax _____ 12.0
  Polyethylene glycol 200 _____ 5.0
  Polyethylene glycol 500 _____ 15.0
  Methyl paraben _____ 0.065
  Propylparaben _____ 0.035
  Distilled water to 100.0.

Throat lozenge:
  1,10-bis-N,N-(4-benzhydrylidene - 1 - methylpiperidine)decane dibromide _____ 0.1 gm.
  Mineral oil _____ 0.0025
  Sucrose to make 1.0 gm.

Ointment:
  1,10 - bis - N,N-(4-benzhydrylidene-1-methylpiperidine)decane dibromide _____ 0.2
  Carbitol _____ 5.0
  Oleyl alcohol _____ 25.0
  Glyceryl monostearate _____ 10.0
  Microcrystalline wax _____ 15.0
  Petrolatum _____ 30.0
  Liquid petrolatum to 100.0.

| Topical paint: | Parts by weight |
|---|---|
| 1,10 - bis - N,N-(4-benzhydrylidene-1-methyl-piperidine)decane dibromide | 1.0 |
| Benzyl alcohol | 5.0 |
| Distilled water | 10.0 |
| Propylene glycol to 100.0. | |

Dusting powder:
| 1,10 - bis - N,N-(4-benzhydrylidene-1-methyl-piperidine)decane dibromide | 0.2 |
|---|---|
| Kaolin | 50.0 |
| Talc to 100.0. | |

The following examples are further illustrative of the invention. It is to be noted that although the examples are concerned with the preparation of the bis-quaternary halides, all of these compounds may be readily converted to other bis-quaternary salts by the conventional methods described above. No limitation is intended, therefore, except as defined by the appended claims.

EXAMPLE 1

*1,5-Bis-N,N-(4-Benzhydrylidene-1-Methylpiperidine)-Pentane Dibromide*

A mixture of 13.2 grams of N-methyl-4-benzhydrylidenepiperidine and 5.8 grams of 1,5-dibromopentane was heated together at 100° to 150° for 1–2 hours. The hygroscopic compound when recrystallized from ethanol-ether mixture melted at 122° to 124°.

EXAMPLE 2

*1,6-Bis-N,N-(4-Benzhydrylidene-1-Methylpiperidine)-Hexane Dibromide*

A mixture of 13.2 grams of N-methyl-4-benzhydrylidenepiperidine and 6.1 grams of 1,6-dibromohexane was heated at 80° to 85° whereupon an exothermic reaction occurred with the temperature rising to 130°. On cooling, the mixture solidified. After several recrystallizations from methanol-ether, the compound melted at 283° to 284.8°.

EXAMPLE 3

*1,8-Bis-N,N-(4-Benzhydrylidene-1-Methylpiperidine)-Octane Dibromide*

A mixture of 13.2 grams of N-methyl-4-benzhydrylidenepiperidine and 7.0 grams of 1,8-dibromo-octane was heated slowly to 170° for 10 minutes. After cooling, the product was recrystallized from ethanol-ether, melting point 242° to 244°.

EXAMPLE 4

*1,9-Bis-N,N-(4-Benzhydrylidene-1-Methylpiperidine)-Nonane Dibromide*

Prepared in the same manner as in Example 3, 13.0 grams of N-methyl-4-benzhydrylidenepiperidine and 7.5 grams of 1,9-dibromononane gave a solid product which when recrystallized from ethanol ether melted at 235.4° to 236.2°.

EXAMPLE 5

*1,10-Bis-N,N-(4-Benzhydrylidene-1-Methylpiperidine)-Decane Dibromide*

A solution of 131.5 grams of 4-benzhydrylidene-1-methylpiperidine and 75 grams of 1,10-dibromodecane in 550 ml. of n-butanol was stirred and refluxed for 6 hours. The material which had solidified on cooling was filtered off and washed with 1 liter of acetone. The product was stirred and refluxed with 1 liter of acetone for 30 minutes, filtered off and dried at 65° in a vacuum oven. The compound melted at 227.0° to 229.8°.

EXAMPLE 6

*1,12-Bis-N,N-(4-Benzhydrylidene-1-Methylpiperidine)-Dodecane Dibromide*

According to the procedure of Example 3, 13.2 grams of N-methyl-4-benzhydrylidenepiperidine and 8.2 grams of 1,2-dibromododecane were reacted to give the title product.

EXAMPLE 7

*1,14-Bis-N,N-(4-Benzhydrylidene-1-Methylpiperidine)-Tetradecane Dibromide*

A mixture of 13.2 grams of N-methyl-4-benzhydrylidenepiperidine and 8.9 grams of 1,4-dibromotetradecane were treated according to Example 3 to yield the title product.

EXAMPLE 8

*1,16-Bis-N,N-(4-Benzhydrylidene-1-Methylpiperidine)-Hexadecane Diiodide*

Following the procedure outlined in Example 3, the mixture of 6.5 grams of N-methyl-4-benzhydrylidenepiperidine and 6.0 grams of 1,16-diiodohexadecane yielded a product, when recrystallized from ethanol ether, softens at 175°, melts completely at 204°.

EXAMPLE 9

*1,5-Bis-N,N-(4-Benzhydrylidene-1-Methylpiperidine)-3-Methylpentane Dibromide*

A mixture of 6.1 grams of 3-methyl-1,5-dibromopentane and 13.2 grams of 4-benzhydrylidene-1-methylpiperidine was heated in a metal bath at 100° to 166° at which time the material became viscous. The viscous oil was dissolved in ethanol and ethyl ether was added until no more oil separated. The separated oil was ground with ether and the fine powder which resulted was filtered off. It melted at 86° to 92°.

EXAMPLE 10

The dichloride and diiodide salts corresponding to the dibromide salts prepared according to Examples 1–7 and 9 and the dichloride and dibromide salts corresponding to the diiodide salt prepared according to Example 8 are obtained by substituting one molecular proportion of an appropriate dihaloalkane for that specified in the above procedures; all other reaction conditions being the same. In this manner, 1,5-bis-N,N-(4-benzhydrylidene-1-methylpiperidine)-pentane dichloride,
1,5-bis-N,N-(4-benzhydrylidene-1-methylpiperidine)-pentane diiodide,
1,6-bis-N,N-(4-benzhydrylidine-1-methylpiperidine)-hexane dichloride,
1,6-bis-N,N-(4-benzhydrylidene-1-methylpiperidine)-hexane diiodide,
1,8-bis-N,N-(4-benzhydrylidene-1-methylpiperidine)-octane dichloride,
1,8-bis-N,N-(4-benzhydrylidene-1-methylpiperidine)-octane diiodide,
1,9-bis-N,N-(4-benzhydrylidene-1-methylpiperidine)-nonane dichloride,
1,9-bis-N,N-(4-benzhydrylidene-1-methylpiperidine)-nonane diiodide,
1,10-bis-N,N-(4-benzhydrylidene-1-methylpiperidine)-decane dichloride,
1,10-bis-N,N-(4-benzhydrylidene-1-methylpiperidine)-decane diiodide,
1,12-bis-N,N-(4-benzhydrylidene-1-methylpiperidine)-dodecane dichloride,
1,12-bis-N,N-(4-benzhydrylidene-1-methylpiperidine)-dodecane diiodide,
1,14-bis-N,N-(4-benzhydrylidene-1-methylpiperidine)-tetradecane dichloride,
1,14-bis-N,N-(4-benzhydrylidene-1-methylpiperidine)-tetradecane diiodide,
1,16-bis-N,N-(4-benzhydrylidene-1-methylpiperidine)-hexadecane dibromide,
1,16-bis-N,N-(4-benzhydrylidene-1-methylpiperidine)-hexadecane dichloride, 1,5-bis-N,N-(4-benzhydrylidene-1-methylpiperidine)-3-methylpentane dichloride, and
1,5-bis-N,N-(4-benzhydrylidene-1-methylpiperidine)-3-methylpentane diiodide are readily prepared.

Where lower alkyl substituents other than methyl are desired (e.g. ethyl, propyl, butyl, etc.), it is merely necessary to substitute two molecular proportions of an appropriately substituted 4-benzhydrylidene-1-lower alkyl piperidine as the starting material in the above examples.

I claim:

1. Compounds of the formula:

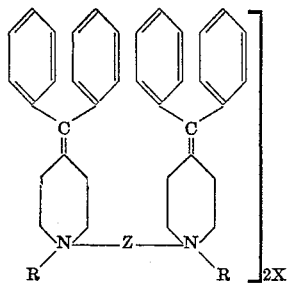

wherein R is a lower alkyl radical; Z is a member selected from the group consisting of straight and branched chain saturated hydrocarbons having from 2 to 18 carbon atoms; and X is the anion of a pharmaceutically acceptable non-toxic acid.

2. The compound 1,10-bis-N,N-(4-benzhydrylidene-1-methylpiperidine)-decane dibromide.

3. The compound 1,10-bis-N,N-(4-benzhydrylidene-1-methylpiperidine)-decane dichloride.

4. The compound 1,10-bis-N,N-(4-benzhydrylidene-1-methylpiperidine)-decane diiodide.

5. The compound 1,12-bis-N,N-(4-benzhydrylidene-1-methylpiperidine)-dodecane dibromide.

6. The compound 1,12-bis-N,N-(4-benzhydrylidene-1-methylpiperidine)-dodecane dichloride.

7. The compound 1,12-bis-N,N-(4-benzhydrylidene-1-methylpiperidine)-dodecane diiodide.

8. The compound 1,14-bis-N,N-(4-benzhydrylidene-1-methylpiperidine)-tetradecane dibromide.

9. The compound 1,14-bis-N,N-(4-benzhydrylidene-1-methylpiperidine)-tetradecane dichloride.

10. The compound 1,14-bis-N,N-(4-benzhydrylidene-1-methylpiperidine)-tetradecane diiodide.

No references cited.